US011422980B2

(12) United States Patent
Farkas et al.

(10) Patent No.: US 11,422,980 B2
(45) Date of Patent: Aug. 23, 2022

(54) POLICY-BASED SELECTION AND CONFIGURATION OF TARGET SITE RESOURCES FOR DATA REPLICATION

(71) Applicant: VMware, Inc., Palo Alto, CA (US)

(72) Inventors: Keith Farkas, San Carlos, CA (US); Martin Marinov, Sofia (BG); Martin Valkanov, Sofia (BG); Konstantin Ivanov, Sofia (BG); Ajay Verghese, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 1593 days.

(21) Appl. No.: 14/863,314

(22) Filed: Sep. 23, 2015

(65) Prior Publication Data

US 2017/0060899 A1 Mar. 2, 2017

Related U.S. Application Data

(60) Provisional application No. 62/212,532, filed on Aug. 31, 2015.

(51) Int. Cl.
*G06F 16/178* (2019.01)
*G06F 16/182* (2019.01)
*G06F 11/14* (2006.01)

(52) U.S. Cl.
CPC ............ *G06F 16/178* (2019.01); *G06F 11/14* (2013.01); *G06F 16/1844* (2019.01)

(58) Field of Classification Search
CPC .. G06F 17/30174; G06F 11/14; G06F 16/178; G06F 16/1844
See application file for complete search history.

(56) References Cited

U.S. PATENT DOCUMENTS 5,765,171 A * 6/1998 Gehani .................. G06F 16/27
7,325,019 B2 * 1/2008 Lam .................... H04L 41/0893
(Continued)

OTHER PUBLICATIONS

Getting Started with Azure Site Recovery: On-Premises to On-Premises Protection, Microsoft Azure, http://azure.microsoft.com/en-us/documentation/, downloaded on Aug. 27, 2014, Microsoft 2014, 16 pages.

(Continued)

*Primary Examiner* — Kannan Shanmugasundaram
(74) *Attorney, Agent, or Firm* — Fish & Richardson P.C.

(57) ABSTRACT

Exemplary methods, apparatuses, and systems include a target site management server transmitting, to a source site management server, a plurality of protection service plans available for replication of data from the source site to the target site. The transmission of the protection service plans includes a description of one or more service level characteristics provided by each protection service plan and excludes a listing of physical and virtual resources within the target site that are to provide the service level characteristics. The target site management server receives selection of one of the protection service plans and determines the physical resources within the target site to provide the advertised service level characteristics for the data replication. The target site management server further transmits configuration details to one or more of the determined physical resources to implement the replication infrastructure within the target site according to the selected protection service plan.

19 Claims, 4 Drawing Sheets

(56) References Cited

U.S. PATENT DOCUMENTS

| | | | |
|---|---|---|---|
| 7,685,378 B2 | 3/2010 | Arakawa et al. | |
| 7,822,749 B2* | 10/2010 | Prahlad | G06F 16/907 |
| | | | 707/737 |
| 9,645,899 B1* | 5/2017 | Felstaine | G06F 11/2002 |
| 9,817,722 B2* | 11/2017 | Gallagher | G06F 11/1484 |
| 9,984,079 B1* | 5/2018 | Stickle | G06F 3/0685 |
| 2005/0033757 A1* | 2/2005 | Greenblatt | G06F 16/10 |
| 2005/0060275 A1 | 3/2005 | Steuernagel | |
| 2005/0289553 A1* | 12/2005 | Miki | G06F 11/2007 |
| | | | 718/104 |
| 2008/0133871 A1 | 6/2008 | Holt | |
| 2009/0313503 A1* | 12/2009 | Atluri | G06F 11/1453 |
| | | | 714/19 |
| 2010/0115329 A1* | 5/2010 | Tanaka | G06F 11/201 |
| | | | 714/5.11 |
| 2011/0022574 A1 | 1/2011 | Hansen | |
| 2013/0024426 A1* | 1/2013 | Flowers | G06F 11/1456 |
| | | | 707/654 |
| 2013/0036323 A1* | 2/2013 | Goose | G06F 11/1484 |
| | | | 714/4.11 |
| 2014/0081906 A1 | 3/2014 | Geddam et al. | |
| 2014/0189441 A1 | 7/2014 | Shida et al. | |
| 2014/0317438 A1 | 10/2014 | Ripoll | |
| 2016/0162370 A1* | 6/2016 | Mehta | G06F 16/162 |
| | | | 707/610 |
| 2017/0060900 A1* | 3/2017 | Marinov | G06F 16/178 |
| 2018/0067827 A1 | 3/2018 | Gallagher et al. | |

OTHER PUBLICATIONS

Cook, Joe, VMware vSphere Blog, vSphere Storage Policy Based Management Overview part 1, posted on Sep. 29, 2014, http://blogs.vmware.com/vsphere, 8 pages.

Cook, Joe, VMware vSphere Blog, vSphere Storage Policy Based Management Overview part 2, posted on Oct. 9, 2014, http://blogs.vmware.com/vsphere, 8 pages.

Final Office Action from U.S. Appl. No. 14/473,984 dated Oct. 20, 2016 15 pages.

Final Office Action from U.S. Appl. No. 14/863,336, dated May 3, 2018, 7 pages.

Non-Final Office Action from U.S. Appl. No. 14/473,984 dated Jan. 26, 2017, 14 pages.

Non-Final Office Action from U.S. Appl. No. 14/473,984 dated Mar. 25, 2016, 18 pages.

Non-Final Office Action from U.S. Appl. No. 14/863,336 dated Sep. 20, 2017, 23 pages.

Notice of Allowance from U.S. Appl. No. 14/473,984 dated Jul. 21, 2017, 8 pages.

Non-Final Office Action from U.S. Appl. No. 14/863,336 dated Aug. 15, 2018, 8 pages.

\* cited by examiner

POLICY-BASED SELECTION AND CONFIGURATION OF TARGET SITE RESOURCES FOR DATA REPLICATION

CROSS-REFERENCE TO RELATED APPLICATIONS

This application claims the benefit of U.S. Provisional Application No. 62/212,532, filed Aug. 31, 2015, which is hereby incorporated by reference.

FIELD OF THE INVENTION

The various embodiments described herein relate to managing replication of data between two or more different data center sites. In particular, embodiments relate to automating the selection and configuration of target sites and the corresponding physical and virtual resources for replication.

BACKGROUND OF THE INVENTION

An important consideration for the architecture of a virtual data center includes the provisioning of virtual machines and other data to the proper storage such that the storage meets certain service-level agreements (SLAs), recovery point objectives (RPOs), or other service goals. For example, storage may be selected based upon capacity, performance, availability, redundancy, etc. needed for a particular application running on the virtual machine. Another important consideration includes maximizing the availability of data, virtual machines, and the services provided by virtual machines. Availability solutions are designed to improve the resiliency of local systems or entire sites. For example, disaster recovery is an availability solution for recovering all or a portion of a data center a recovery site from replicated data. A logical storage device within a source or protected data center site may be configured for replication to a target or recovery data center site. This replication of data may also need to be configured such that it meets SLAs, RPOs, or other service goals.

Due to their separate knowledge domains, the tasks of configuring storage and replication resources are separate from the tasks for provisioning and maintaining individual virtual machines and other data in a typical enterprise. A storage administrator typically handles the former while an application owner or virtual infrastructure user handles the latter. The execution of these tasks for each application typically follows a business workflow that includes the application owner requesting storage from the storage administrator that meets specific requirements. The storage administrator uses the specific requirements to provision one or more storage devices with the corresponding capabilities. Information about the provisioned storage is given to the application owner who, in turn, provisions virtual machine(s) for the application(s) using the storage.

Replication of data is further complicated by the selection of another site to serve as a replication target and the selection and configuration of physical and virtual resources within the other site. For example, potential target sites expose the resources available and an administrator manually selects a target site and specific resources in that site to facilitate the desired replication. This manual process is complex for novice users and places more focus on the replication infrastructure than the application/data owner's requirements of availability, replication, and/or recovery. Additionally, this manual process requires a lot of specific details about the resources within the target site to be provided to the source site.

BRIEF DESCRIPTION OF THE DRAWINGS

The present invention is illustrated by way of an example and not limited to the figures and the accompanying drawings, in which like references indicate similar elements, and in which.

DETAILED DESCRIPTION

Figure 1:
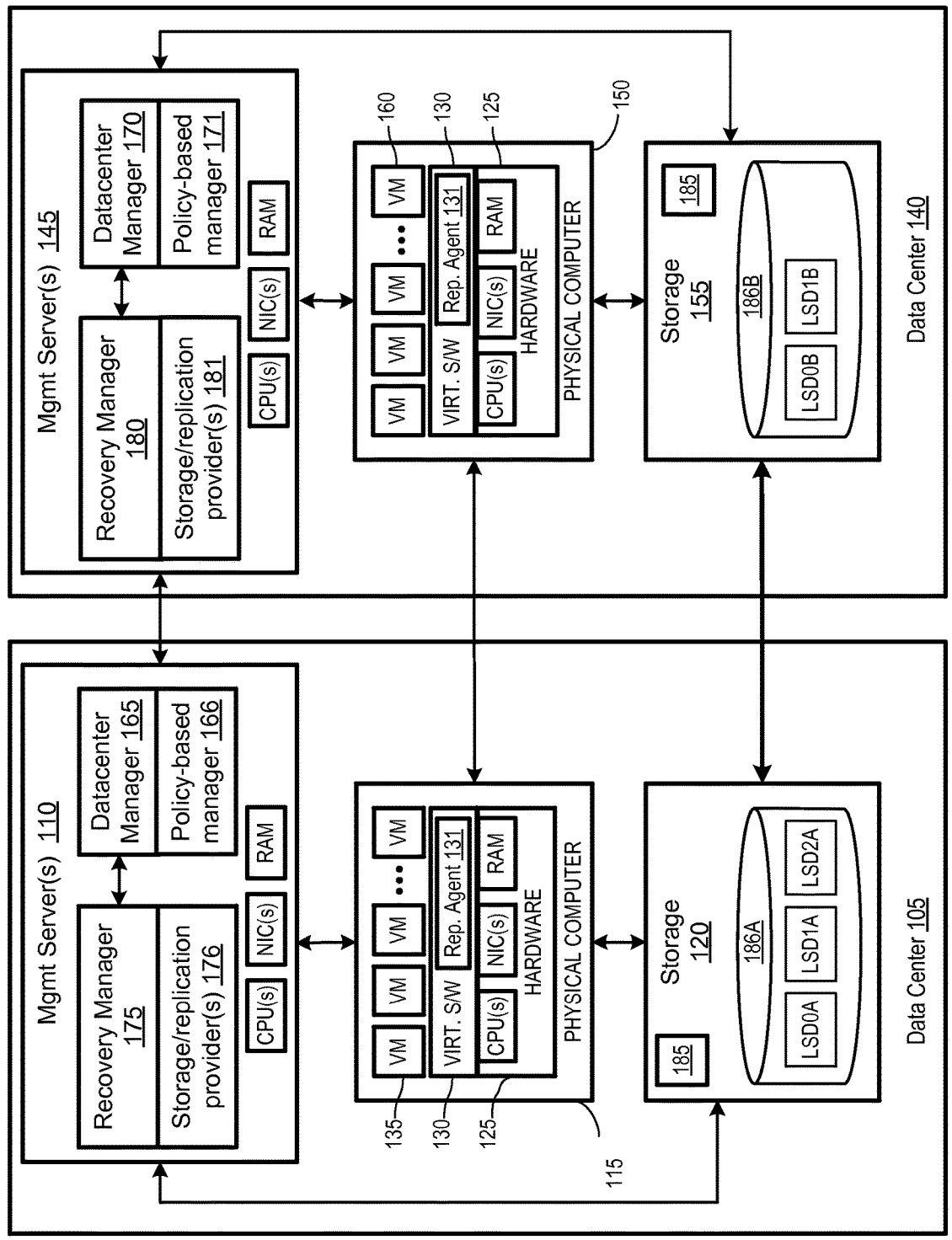
FIG. 1 illustrates, in block diagram form, exemplary virtual data centers configured to automate the selection and configuration of target sites and physical and virtual resources for replication.

Embodiments described herein include a management server within a target physical computing site transmitting, to a management server within a source physical computing site, a plurality of protection service plans available within the target site for replication of data from the source site to the target site. The transmission of the protection service plans includes a description of one or more service level characteristics provided by each protection service plan and excludes a listing of physical and virtual resources within the target site that are to provide the service level characteristics. For example, the service level characteristics may include a range of service level values available under each protection service plan for a recovery point objective (RPO), storage capacity, a data retention policy, an encryption policy, Input/Output Operations Per Second (IOPS), etc. while excluding a listing of a listing of storage devices and host devices to receive the replicated data. The target site management server receives selection of one of the protection service plans and determines the physical resources within the target site that are to provide the advertised service level characteristics for data replicated from the source site. For example, the target site management server may determine and/or maintain a data structure including the service level limitations of storage devices, host devices, virtual machines, networking devices (e.g., routers/switches), etc. and determines which of the resources meet the service level characteristics of each protection service plan. The target site management server further transmits configuration details to one or more of the determined physical resources to implement the replication infrastructure within the target site according to the selected protection service plan. As a result, embodiments simplify the configuration of the replication of data to another site. The protection service plans decouple the protection of data from the identification of storage devices and other resources within the replication path.

Additionally, embodiments described herein include a source site management server receiving, from multiple target site management servers, characteristics of each target site that affect replication of data from the source site to each target site. For example, each target site advertises one or more of a physical geographical location, types of workloads supported, types of hardware available, network throughput, one or more RPOs, etc. The source site management server further receives selection of one or more criteria to be met by a target site for replication of data from the source site to the target site. For example, the owner of one or more virtual machines or other data to be replicated may select values that correspond to the advertised characteristics. The source site management server determines which target site is a match for the received criteria based upon a comparison of the received criteria with the received characteristics of the target computing sites. The source site management server, in response to the determination of a target computing site that matches the received criteria, configures the replication of data to the target site.

FIG. 1 illustrates, in block diagram form, exemplary virtual data centers configured to automate the selection and configuration of target sites and physical and virtual resources for replication. While the present description includes examples that reference data centers as source and target sites, embodiments are not limited to a particular scale of source and/or target sites. References to a data center may be used interchangeably with a physical computing site that, e.g., houses one or more host computer systems, storage devices, and associated networking components.

Data center 105 includes management server(s) 110, one or more host devices 115, and storage 120. Each host device 115 includes hardware 125, virtualization software layer 130 (also referred to as a hypervisor), and virtual machines (VMs) 135. Similarly, data center 140 includes management server(s) 145, one or more host devices 150, and storage 155. Each host device 150 includes hardware 125, virtualization software layer 130, and VMs 160. In one embodiment, data center 105 represents a first data center site and data center represents a second, geographically distinct data center site. The interconnection(s) between data center 105 and data center 140 may represent, e.g., a wide area network.

VMs 135 and 160 are complete computation environments, containing virtual equivalents of the hardware and system software components of a physical system and are typically implemented by an extensive virtualization infrastructure, which includes a variety of software and hardware components. For example, one or more of the VMs may implement virtual desktops. A virtual desktop is a virtual computing system that operates as a desktop or workstation computer with which an end user can interact using a desktop remoting protocol over a network. In one embodiment, one or more of the VMs implement a virtualized compute, networking, storage, or security service (e.g., a firewall, webserver, database server, etc.).

Virtualization software layer 130 runs on hardware 125 of host device (e.g., a physical computer) 115/150 and manages one or more VMs 135/160. Virtualization software layer 130 manages physical resources, e.g., hardware 125, as well as maintains virtual-to-physical hardware mappings. For example, virtualization software 130 may manage VM access to a processor, memory, or network interface within hardware 125 as well as a virtual disk or other logical storage device within underlying storage 120/155.

In one embodiment, virtualization software layer 130 includes replication agent 131. Replication agent 131 may be configured for host-based replication of one or more VMs 135/160 or other data. For example, replication agent 131 within a source site may create a copy of data from input/output (I/O operations) from VMs and transmit the copy to a target site to implement replication of the data.

Hardware 125 includes one or more processors ("CPU(s)"), data storage and memory (e.g., "RAM"), and network interface controllers ("NIC(s)"). The data storage and memory may be used for storing data, metadata, and programs for execution by the processor(s). The data storage and memory may include one or more of volatile and non-volatile memories, such as Random Access Memory ("RAM"), Read Only Memory ("ROM"), a solid state disk ("SSD"), Flash, Phase Change Memory ("PCM"), or other types of data storage, such as magnetic disk drives, optical disk drives, etc. The memory may be internal or distributed memory. One or more buses (not shown) may be used to interconnect the various components of hardware 125.

Each of storage 120 and storage 155 includes one or more physical storage devices. In one embodiment, storage 120 and storage 155 include storage controllers 185 to serve read and write requests and management commands/queries from host devices 115/150 and management servers 110/145. Each of storage 120 and storage 155 is partitioned into logical units, volumes, virtual volumes, and/or disks (which are collectively referred to herein as logical storage devices) that are stored on one or more of the physical storage devices. Each logical storage device is identified by a device identifier, e.g., a logical unit number (LUN), volume identifier, etc. For example, storage 120 is illustrated as including logical storage devices LSD0A, LSD1A, and LSD2A within array 186A and storage 155 is illustrated as including logical storage devices LSD0B and LSD1B within array 186B. Each of storage 120 and storage 155 may include additional arrays, logical storage devices, or other partitions of storage.

In one embodiment, storage 120 may be configured for active-passive replication of, e.g., logical storage device LSD0A, to storage 155, e.g., logical storage device LSD0B. As used herein, active-passive replication provides a redundant copy of a logical storage device within the target data center, which is only brought online when the associated source storage device within the protected data center fails or subject to a planned failover. For example, the active instance, logical storage device LSD0A, is available for read and write commands from VMs 135 in host device(s) 115. The passive instance, logical storage device LSD0B, is a copy of logical storage device LSD0A and not available for read and write commands from any VMs 135/160 or hosts device(s) 115/150 in order to prevent corruption of the replicated data. Storage 120 may also be configured for active-active replication and other forms of replication.

Management server(s) 110 includes data center manager 165. In one embodiment, data center manager 165 provides a management console for manual and automated control of hosts 115, VMs 135, and storage 120. Similarly, data center manager 170 provides a management console for manual and automated control of hosts 150, VMs 160, and storage 155. For example, data center manager 165 and data center manager 170 provision, configure, and maintain VMs as virtual desktops or network services, manage pools of computer resources to run the VMs, etc.

In one embodiment, data center mangers 165/170 include or otherwise work cooperatively with respective policy-based managers 166/171. Replication goals or requirements, such as performance, availability, network throughput, storage capacity, data retention policy, RPOs, or other service-level characteristics, can be associated with protection service plans. A protection service plan is an abstraction of replication resources, such as storage devices, host computers, virtual machines, switches/routers, etc. within a replication path, that are treated as a single entity based upon common service-level characteristics. For example, an administrator using policy-based manager 166 defines a protection service plan for a defined performance characteristic and associates logical storage devices LSD0A and LSD1A (that meet the performance characteristic) with the protection service plan. In one embodiment, a service-level characteristic is represented by a key-value pair, where the key is a specific property that the replication resource can offer and the value is a metric, or a range, that the replication resource guarantees for replicated data. For example, storage performance capabilities include capacity, storage space reservation, failure tolerance, cache size, performance speed, availability, redundancy, etc. Networking device capabilities include bandwidth, throughput, etc. Host computer capabilities include capacity, cache size, performance speed, availability, application support, etc. In one embodiment, replication resources are associated with a protection service plan through the use of tags stored in metadata in memory by the corresponding devices and/or in a data structure maintained by the policy-based manager 166/171.

Policy-based managers 166/171 may further associate VMs, logical storage devices, or other data with protection service plans. The association of data with a protection service plan indicates that the data should be replicated targeting or otherwise using the replication resources that meet the service-level characteristics of the protection service plan or otherwise associated with the protection service plan as described above. For example, a VM may be included within or otherwise associated with a protection service plan based upon a requirement for a minimum storage capability. To illustrate such an example, a storage administrator or the application administrator (end user) for VM 135 uses policy-based manager 166 to create an association between VM 135 and a corresponding protection service plan. The administrator may associate a high-priority VM with a protection service plan that guarantees a high level of storage performance/reliability and low-priority VM with a protection service plan that does not guarantee such a high level of storage performance/reliability. In one embodiment, VMs, logical storage devices, or other data area associated with a protection service plan through the use of a tag stored in metadata and/or in a data structure maintained by the policy-based manager 166/171.

Management servers 110/145 further include recovery managers 175/180. The recovery managers 175/180 provide administrative access to define protection groups, recovery plans, a preferred recovery type, and other failover policies. Recovery managers 175/180 further provide the implementation for unplanned failover, planned failover, test failover, and other data availability/recovery workflows. Additionally, recovery managers 175/180 automate the protection of VMs for disaster recovery based upon the inclusion of VMs within a protection service plan. For example, upon detection of a failover event, a recovery manager restarts a VM within the target site using replicated data and physical resources associated with the protection service plan.

In one embodiment, recovery managers 175/180 include or otherwise work cooperatively with respective storage/replication provider(s) 176/181. In another embodiment, storage/replication provider(s) 176/181 are included within data center managers 165/170. For example, storage/replication provider(s) 176/181 retrieve information about storage topology, capabilities, and status from underlying storage 120/155. Each storage/replication provider 176/181 enables a corresponding recovery manager 175/180 to send and receive vender-specific commands/messages to and from storage 120/155. For example, in order to provide uniform orchestration for device discovery, failover, synchronization, and test failover workflows across disparate storage arrays in the market, a storage/replication provider specification defines commands issued by recovery manager 175/180 during the various workflows and the expected behavior of the storage arrays for these commands. A corresponding storage/replication provider 176/181 translates the recovery manager commands into vendor-specific commands. In one embodiment, storage/replication provider(s) 176/181 also maintain storage profile tag associations with logical storage devices and/or VMs. In one embodiment, storage/replication provider(s) 176/181 further configure, monitor, and/or otherwise manage individual VM or host-based replication of VMs, virtual disks, or other data.

In one embodiment, data center managers 165/170 are implemented within different management servers 110/145 than recovery managers 175/180. For example, recovery manager 175 may be installed on a separate physical or virtual machine from data center manager 165. In an alternate embodiment, one or more recovery managers 175/180 are implemented by the corresponding data center manager(s) 165/170.

Similar to hosts 115 and 150, each of management servers includes one or more processors ("CPU(s)"), data storage and memory (e.g., "RAM"), and network interface controllers ("NIC(s)"). The data storage and memory may be used for storing data, metadata, and programs for execution by the processor(s). The data storage and memory may include one or more of volatile and non-volatile memories, such as Random Access Memory ("RAM"), Read Only Memory ("ROM"), a solid state disk ("SSD"), Flash, Phase Change Memory ("PCM"), or other types of data storage, such as magnetic disk drives, optical disk drives, etc. The memory may be internal or distributed memory. One or more buses (not shown) may be used to interconnect the various components of this management server hardware. Additionally, each recovery manager, datacenter manager, storage/replication provider, and/or policy-based manager may be implemented on a separate set of hardware, such as CPU(s), RAM, and NIC(s).

Figure 2:
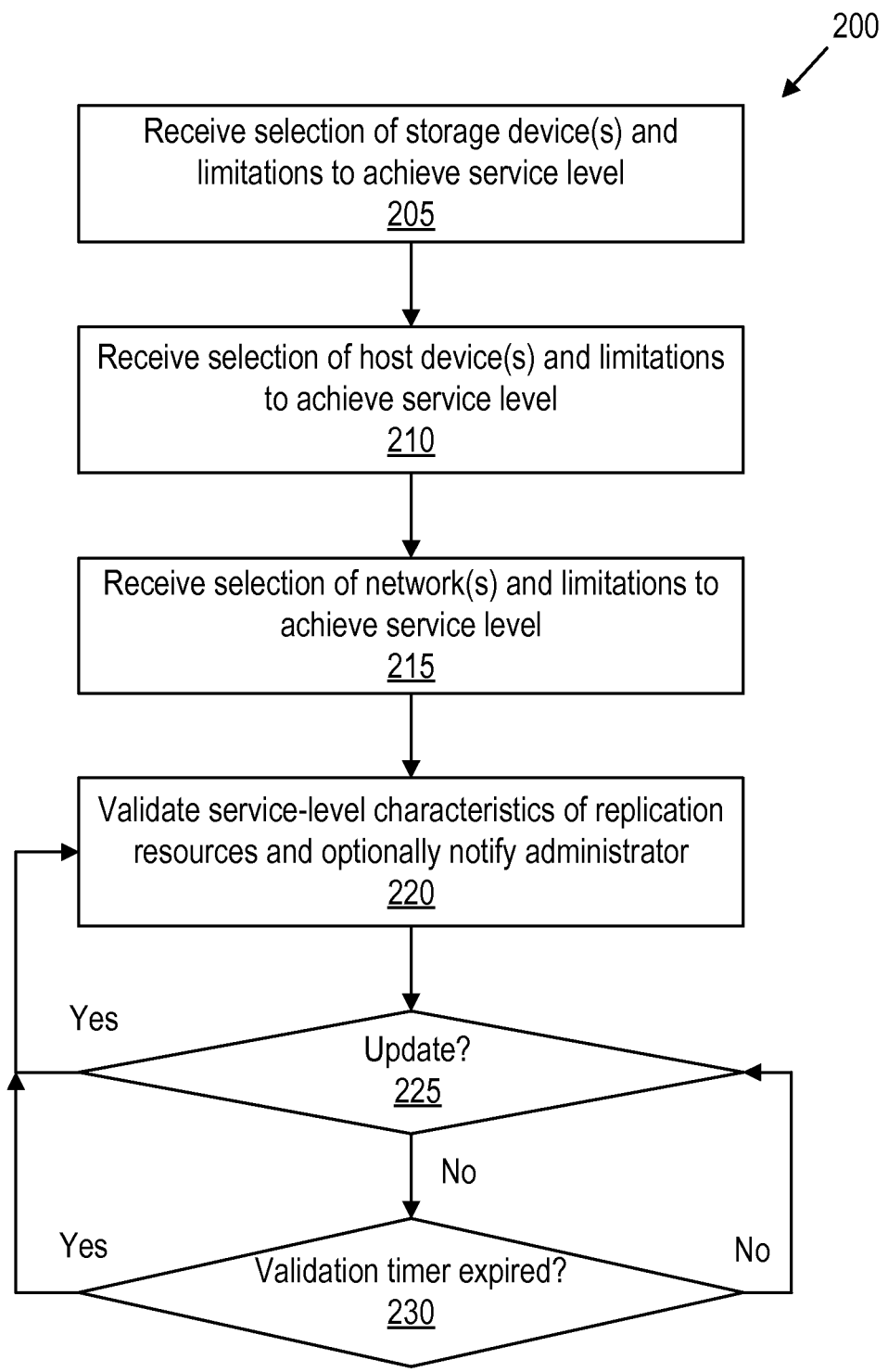
FIG. 2 is a flow chart illustrating an exemplary method of configuring and validating a protection service plan.

FIG. 2 is a flow chart illustrating exemplary method 200 of configuring and validating a protection service plan. At block 205, a management server receives selection of one or more storage devices to be included within the protection service plan and/or a range or limitation(s) of service-level characteristics for the storage devices. For example, management server 145 queries underlying storage 155 for logical storage devices and their capabilities. In one embodiment, an administrator may initiate such a query through a management console for a management server 145. In an alternate embodiment, the administrator queries underlying storage 155 via vendor-supplied array software. In response to the query, management server 145 receives key-value pairs or other descriptions of the logical storage device capabilities or other service-level characteristics from the underlying storage 155. Using the received service-level characteristics, the administrator associates each of one or more storage devices 155 with a protection service plan to provide the corresponding range or limit(s) of storage service-level characteristics. Exemplary storage service-level characteristics include total storage capacity, available storage capacity, storage space reservation, failure tolerance, cache size, performance speed, availability, redundancy, etc.

At block 210, the management server receives selection of one or more host computers to be included within the protection service plan and/or a range or limitation(s) of service-level characteristics for the host computers. For example, management server 145 queries host computers 150 for their service-level characteristics (e.g., the characteristics the physical computers and/or the characteristics of virtual machines/appliances implemented by the physical computers). In one embodiment, an administrator may initiate such a query through a management console for a management server 145. In response to the query, management server 145 receives key-value pairs or other descriptions of the service-level characteristics from host(s) 155. Using the received service-level characteristics, the administrator associates each of one or more hosts 150 with a protection service plan to provide the corresponding range or limit(s) of storage service-level characteristics. Exemplary host computer service-level characteristics include applications supported, VM availability, storage capacity, failure tolerance, cache size, processing performance, networking performance, availability, encryption, etc.

At block 215, the management server receives selection of one or more networking resources to be included within the protection service plan and/or a range or limitation(s) of service-level characteristics for the networking resources. For example, management server 145 queries switches and/or routers for their service-level characteristics. The networking resources may be separate physical devices, implemented as virtual appliances by host computers, or a combination of both. In one embodiment, an administrator may initiate such a query through a management console for a management server 145. In response to the query, management server 145 receives key-value pairs or other descriptions of the service-level characteristics from the networking resources. Using the received service-level characteristics, the administrator associates each of one or more of the networking resources with a protection service plan to provide the corresponding range or limit(s) of storage service-level characteristics. Exemplary networking service-level characteristics include processing performance, response time, latency, jitter, packet loss, network throughput, network speed, and other networking performance capabilities.

In one embodiment, the association between a replication resource (e.g., storage device, host computer, networking resource, etc.) and a protection service plan includes updating a data structure and/or adding profile tag to the replication resource. For example, policy-based manager 166/171 stores a list of resources including within a protection service plan and may subsequently discover which resources store profile tags that identify the protection service plan.

In an alternate embodiment, one or more replication resources are automatically included in a protection service plan based upon their respective capabilities or service-level characteristics.

In one embodiment, the protection service plan further includes a set of resources for recovery of replicated data. For example, the protection service plan for a VM may include a set of one or more storage devices and host computers to be used in the case of failing over, migrating, or otherwise starting the VM within the target site. The resources for the replication of a VM or other data may be the same or different resources than those for the recovery of the VM.

As a result, each protection service plan provides an abstraction of a set of one or more resources that are treated as a single entity. The set of resources is elastic (e.g., it can be expanded/contracted to include more/less resources) and fungible (e.g., the included resources are interchangeable with other equivalent resources that provide one or more defined capabilities associated with the protection service plan).

At block 220, the management server validates the service-level characteristics of replication resources associated with each protection service plan. For example, management server 145 periodically queries each of the replication resources to determine if any changes in the resource's capabilities, performance, or other service-level characteristics result in the resource no longer falling within the range or limits of service-level characteristics for the protection service plan with which the resource is associated. In one embodiment, the management server generates or transmits a notification to an administrator if a service-level characteristic of a replication resource no longer falls within the range or limits of service-level characteristics for the protection service plan with which the resource is associated. In an alternate embodiment, the management server generates or transmits a notification to an administrator if a service-level characteristic of a replication resource changes by a threshold amount.

At block 225, determines whether one or more protection service plans are to be or have been updated. In one embodiment, an update is triggered by the determination that a service-level characteristic of a replication resource no longer falls within the range or limits of service-level characteristics for the protection service plan with which the resource is associated. For example, the management server may automatically remove a replication resource from a protection service plan if the replication resource no longer meets the expected service-level characteristic. In one embodiment, the administrator removes a replication resource from a protection service plan, e.g. in response to the notification described above. In another embodiment, the update includes the addition of a replication resource, e.g., as described above with reference to blocks 205-215.

If one or more protection service plans have been updated, method 200 returns to block 220 to validate the updated protection service plan(s). If none of the protection service plans have been updated, at block 230, the management server determines if a validation timer has expired. For example, the management server may perform a validation of replication resources on a predefined periodic basis. If the validation timer has expired, method 200 returns to block 220 to validate the protection service plans. If the validation timer has not expired, method 200 returns to block 225 to continuing monitoring for updates to the protection service plans.

Figure 3:
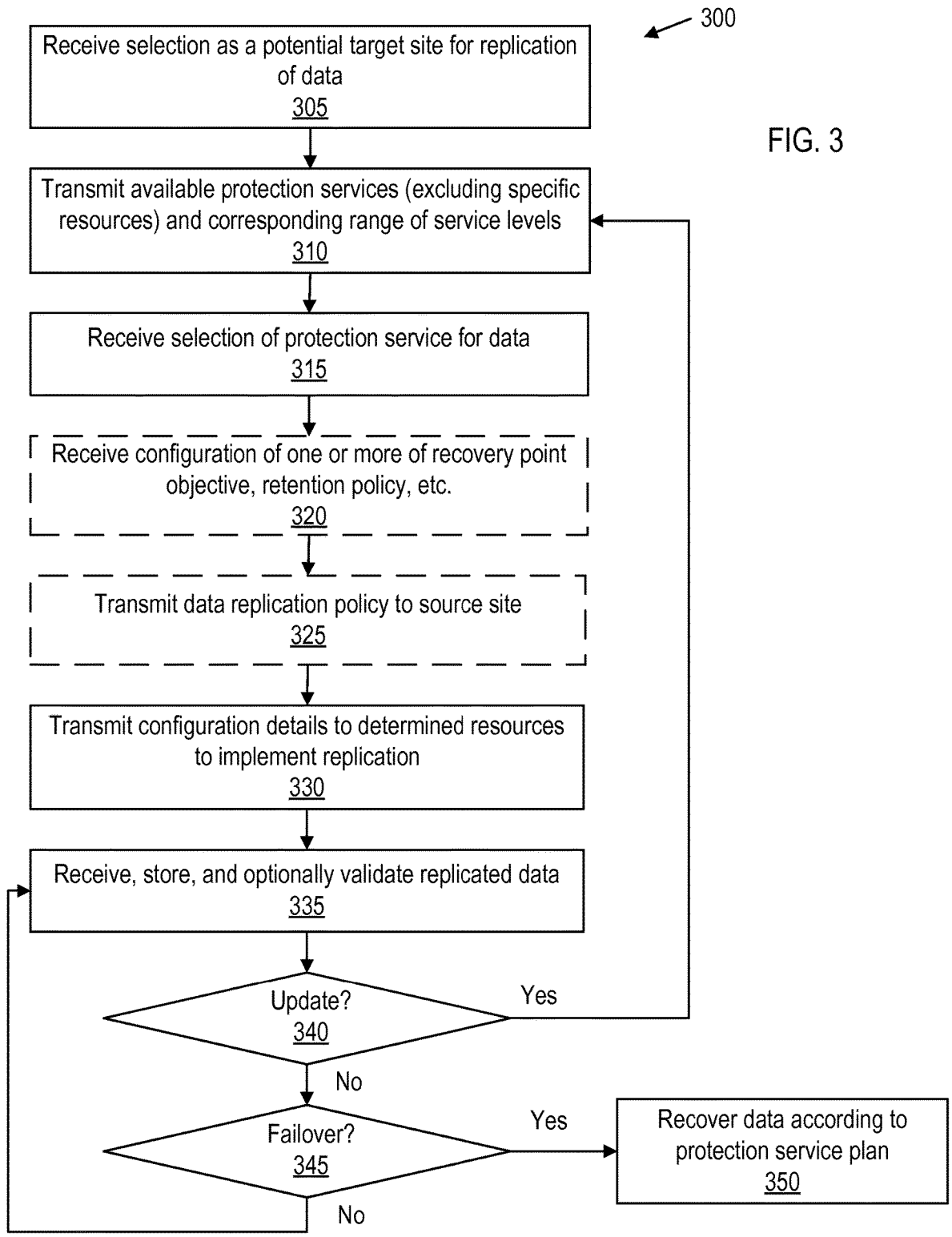
FIG. 3 is a flow chart illustrating an exemplary method of automated selection and configuration of physical and virtual resources for replication.

FIG. 3 is a flow chart illustrating exemplary method 300 of automated selection and configuration of physical and virtual resources for replication. At block 305, a management server receives a selection of its site as a potential target site. For example, a source site management server may transmit the selection or a similar request to the potential target site management server requesting protection service plans available for replication to the potential target site.

At block 310, the target site management server transmits protection service plans available for replication of data to the target site. For example, the transmission of protection service plans may include, for each plan, an identifier for the plan and a qualitative description of service-level characteristics provided by the plan. As described with reference to FIG. 2, the description of service-level characteristics may include limits or a range of service-level characteristic values available under the protection service plan.

In one embodiment, the description includes an indication of redundancy of the replicated data. For example, the replication may include a second hop originating from the target site to an additional target site to create another copy of the data. In such an embodiment, the protection service plan of the first target site references the protection service plan of the additional target site. As another example, the replication may include storing the replicated data in duplicate within two different fault-isolated domains of the target site.

Additionally, given that each protection service plan provides an abstraction of a set of one or more replication resources that are treated as a single entity, the description service-level characteristics provided by each plan omits a listing of specific replication resources associated with the protection service plan. For example, the description does not include a listing of potential target host computers or virtual machines to receive replicated data, data storage devices to store the replicated data, or networking devices to provide the replicated data path to target host computers and/or storage devices.

At block 315, the target site management server receives selection of a protection service plan for data within the source site. For example, in response to the advertisement of available protection service plans, the source site management server transmits the identifier of the protection service plan selected by the administrator or owner of the data.

In one embodiment, the selection of a protection service plan by the source site management server includes the identification of data within the source site that is to be added to the protection service plan. For example, policy-based manager 166 receives selection of one or more VMs 135 to be included within or otherwise associated with the protection service plan. Given that the above-described elastic and fungible qualities of the protection service plan are transparent to the application administrator, an administrator or VM owner may provision VMs 135 in a manner that is agnostic to the actual replication resources to be used within target site 140. In one embodiment, the association between a VM and a protection service plan includes adding the profile tag to the VM. Additionally, policy-based manager 166 maintains the association of this protection service plan with the VM.

At block 320, the target site management server optionally receives configuration of one or more service-level characteristics for the data to be replicated. For example, the selected protection service plan may be advertised as providing a range of service-level characteristic values. The administrator or owner of the data, in addition to selecting the protection service plan, optionally sets a minimum value within the range of one or more service-level characteristics.

At block 325, the target site management server optionally transmits one or more replication policies to the source site management server. It may be recommended or required for the source site to process and/or transmit replicated data in a particular way before transmission to the target site. For example, to address security concerns, a target site may transmit a policy requiring replicated data to be encrypted (e.g., at a threshold strength) at the source site before transmission to the target site. As another example, if the administrator or data owner selects to have replicated data validated on the target side, the target site management server may require the administrator or data owner to provide or select a script or other instructions for performing the validation.

At block 330, the target site management server transmits configuration details to replication resources within the selected protection service plan. For example, the target site management server uses the received configuration of one or more service-level characteristics, current utilization of the resources, etc. to determine which resources associated with the protection service plan to use in implementing the replication. Once determined, the target site management server transmits any configuration information needed to those resources to enable the resources to implement the replication service. For example, the target site management server may select a VM and/or host computer to serve as the target that receives the replicated data from the source site and a storage device to store the replicated data. In transmitting configuration details, the target site management server configures the target to receive the replicated data and write the replicated data to the selected storage device.

In one embodiment, the transmitting of configuration details further includes the target site management server transmitting configuration details to the source site management server. For example, the target site management server transmits target information to enable the source site to direct the replicated data to the correct replication resources.

At block 335, the target site receives and stores the replicated data. As described above, the replicated data may be directed to a target host computer, VM, or other data compute node. The target host computer receives the replicated data and writes it to the selected storage device. In one embodiment, the target host computer validates the replicated data. For example, the host computer may run a validation script received from or selected by the administrator or data owner from the source site.

At block 340, the target site management server determines whether or not to update any of the protection service plans based upon a change of resources (e.g., as described with reference to FIG. 2) or based upon a change of data to be protected. If a protection service plan is to be updated, method 300 returns to block 310 and performs any of blocks 310-330 required to implement the update.

If a protection service plan is not to be updated, at block 345, the protection site management server monitors for a failover, migration, etc. from the source site. For example, a failure within the source site may trigger the restarting of a replicated VM within the target site. If a failover or similar event has not occurred, method 300 returns to block 335.

If a failover or similar event has occurred, at block 350, the protection site management server initiates the recovery of the data (e.g., starts the failed over VM) according to the protection service plan. For example, the protection site management server may have determined one or more resources within the target site to utilize in the instance of a failover of a protected VM.

Figure 4:
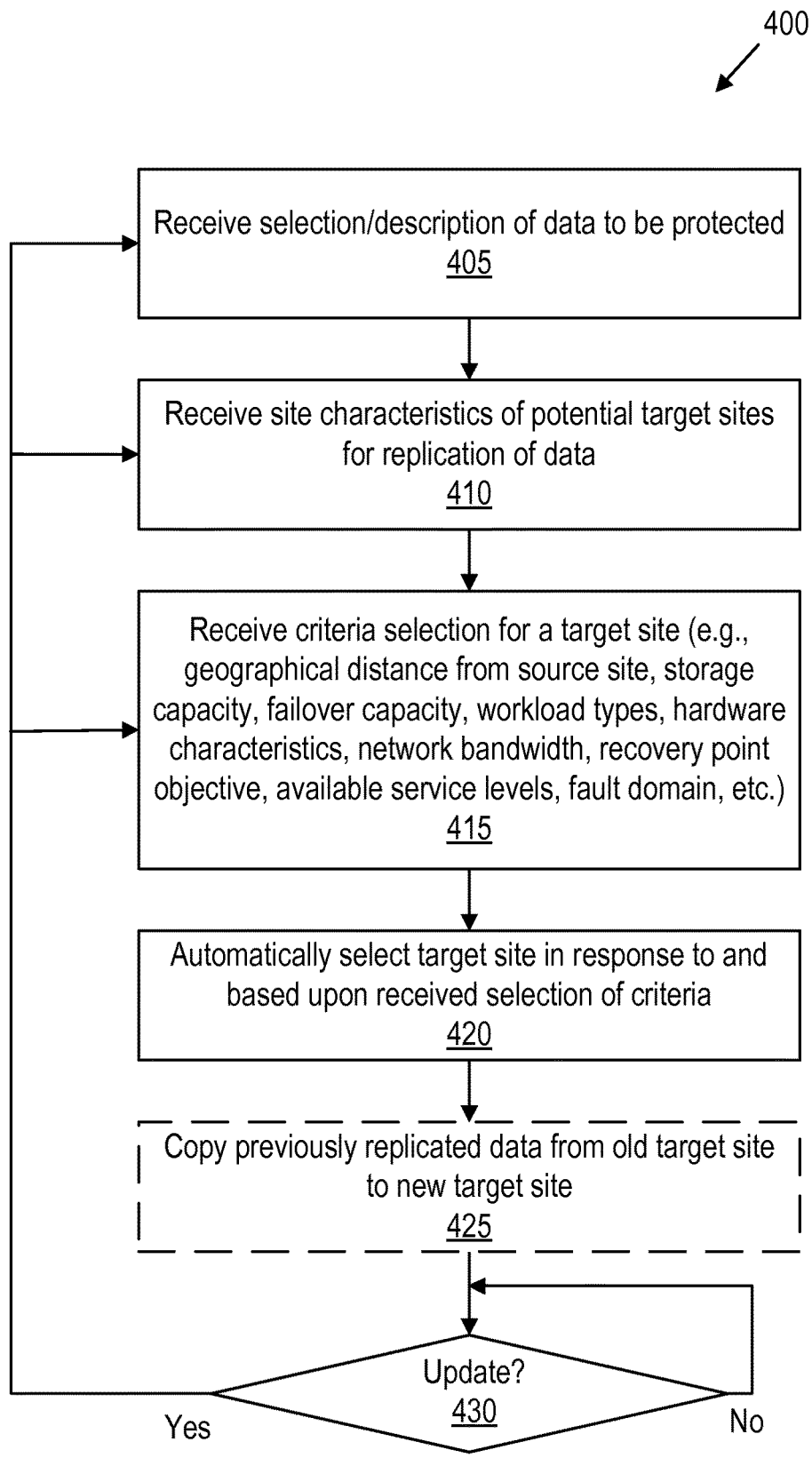
FIG. 4 is a flow chart illustrating an exemplary method of automated selection and configuration of one or more target sites for replication.

FIG. 4 is a flow chart illustrating exemplary method 400 of automated selection and configuration of one or more target sites for replication. At block 405, a source site management server receives selection and/or description of data to be protected. For example, an administrator or owner of data may select one or more VMs, logical storage devices, files, etc. to be replicated to a target site.

At block 410, the source site management server receives, from multiple target site management servers, characteristics of each target site that affect replication of data from the source site to each target site. For example, each target site advertises one or more of a physical geographical location, types of workloads supported, types of hardware available, network throughput, one or more RPOs, etc.

At block 415, the source site management server receives selection of one or more criteria to be met by a target site for replication of data from the source site to the target site. For example, the owner of one or more virtual machines or other data to be replicated may select values that correspond to the advertised characteristics. The data owner may select or otherwise input a geographical constraint (e.g., local, metro, distant, cloud, a threshold distance, etc.), workload types to be replicated, failover capacity, and/or a minimum threshold value for hardware, networking, RPOs, or other service-level characteristics.

At block 420, the source site management server determines which target site is a match for the received criteria based upon a comparison of the received criteria with the received characteristics of the target computing sites. For example, the source site management server compares service-level characteristics defined in the received criteria to advertised ranges of the corresponding service-level characteristics provided by the target sites and selects the target site that best matches the criteria. In response to the determination of a target computing site that matches the received criteria, the source site management server configures the replication of data to the selected target site.

At block 425, the source site management server optionally initiates the copying of previously replicated data from an old target site to the newly selected target site. For example, if an update caused the selection of a new target site for replication, the source site management server may determine based upon a retention policy, priority of data, or other criteria whether or not to instruct the old target site to transmit some or all of the previously replicated data to the new target site.

At block 430, the source site management server monitors for updates that may cause the selection of a new target site. For example, a change of availability or performance of target site replication resources advertised by the target sites may be detected by the source site management server and trigger the source site management server to reevaluate a best match for the target site or if the current target site continues to meet the received criteria. In one embodiment, the source site management server generates and transmits an alert to the administrator or data owner. Alternatively, the administrator or data owner may manually select to reconfigure replication criteria or select a new target site. If there is an update, method 400 returns to block 405, 410, or 415 to enable the administrator or data owner to include additional data in the replication, review updated target site characteristics, and/or update the criteria to be met by a target site.

It will be apparent from this description that aspects of the inventions may be embodied, at least in part, in software. That is, the computer-implemented methods 200, 300, and 400 may be carried out in a computer system or other data processing system, such as management servers 110 and 145, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. Thus, the techniques are not limited to any specific combination of hardware circuitry and software, or to any particular source for the instructions executed by a management server. It will also be appreciated that additional components, not shown, may also be part of the management servers and hosts illustrated in FIG. 1, and, in certain embodiments, fewer components than that shown in FIG. 1 may also be used.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards, solid state drives (SSD), or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention(s) have been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate virtualized resources or, in flow charts, optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method comprising:
   transmitting, by a first management server within a first physical computing site to a second management server within a second physical computing site, a plurality of protection service plans available within the first physical computing site for replication of data from the second physical computing site to the first physical computing site, wherein each protection service plan includes a corresponding description of one or more service-level characteristics provided by each protection service plan, wherein each protection service plan provides an abstraction of a set of physical computing resources for providing replication within the first physical computing site treated as a single entity and wherein each protection service plan describes a particular range of values for each service-level characteristic provided for performing replication of data by that protection service plan and excludes a listing of specific physical computing resources of the first physical computing site that are to provide the service-level characteristics of that protection service plan;
   receiving, by the first management server, a selection of a protection service plan from the plurality of protection service plans and identification of data within the second physical computing site to add to the selected protection service plan for replication on the first physical computing site, wherein the selection specifies a minimum value within the corresponding range of values for each service-level characteristic provided by the selected protection service plan;
   determining, by the first management server, physical resources within the first physical computing site that satisfy the service-level characteristics for the data added to the selected protection service plan, wherein the determination of physical resources is based upon the ranges of service level values specified for the selected protection service plan;
   transmitting, by the first management server to one or more of the determined physical resources, configuration details to implement the replication of the data from the second physical computing site to the first physical computing site; and
   receiving data for replication from the second physical computing site at the first physical computing site.

2. The computer-implemented method of claim 1, wherein the data includes data compute nodes, the method further comprising:
   detecting, by the first management server, a failover event; and
   performing, by the first management server in response to the detected failover event, a failover of the data computer nodes within the first data center site using the determined physical resources.

3. The computer-implemented method of claim 1, further comprising:
   determining, by the first management server, virtual resources within the first physical computing site that are to provide the service-level characteristics for the data added to the selected protection service plan.

4. The computer-implemented method of claim 1, wherein the physical resources excluded from the transmission of the protection service plans include data storage devices to store replicated copies of the data under the protection service plans.

5. The computer-implemented method of claim 1, wherein the physical resources excluded from the transmission of the protection service plans include host devices to receive replicated copies of the data under the protection service plans.

6. The computer-implemented method of claim 1, wherein the description of one of the service-level characteristics provided by each protection service plan includes a policy indicating a length of time the replicated data is retained.

7. The computer-implemented method of claim 1, further comprising:
   receiving, by the first management server, configuration of a maximum amount of data loss that is permitted during a failure within the second physical computing site.

8. The computer-implemented method of claim 1, further comprising:
   receiving, by the first management server for each protection service plan, a selection of data storage devices to store replicated copies of data for the selected protection service plan, wherein the selection of the data storage devices is received from an administrator of the first physical computing site during configuration of the protection service plan.

9. The computer-implemented method of claim 8, further comprising:
   validating, by the first management server, that the selected data storage devices will meet the service-level characteristics of the selected protection service plan.

10. The computer-implemented method of claim 9, wherein the validation is performed in response to an update of the selected protection service plan.

11. The computer-implemented method of claim 1, wherein the selected protection service plan includes replicating the data from the second physical computing site to the first physical computing site and replication of the data from the first physical computing site to a third physical computing site.

12. The computer-implemented method of claim 1, wherein the selected protection service plan includes a periodic validation of replicated data.

13. The computer-implemented method of claim 1, further comprising:
transmitting, by the first management server to the second management server, a requirement that the data be processed within the second physical computing site according to a policy before transmitting a replicated copy of the data to the first physical computing site.

14. The computer implemented method of claim 1, comprising:
transmitting, by the first management server, one or more replication policies to the second management server, wherein the replication policies specify processing to be performed by the second management server prior to transmitting the data for replication on the first physical computing site.

15. The computer implemented method of claim 1, further comprising:
periodically querying, by the first management server, the one or more determined physical resources within the first physical computing site to determine any changes in the respective physical resources that results in a physical resource no longer falling within the specified range of service level values specified for the selected protection service plan;
in response to determining that a particular physical resource no longer falls within the specified range of service level values, updating the protection service plan including removing the particular physical resource from the protection service plan; and
validating the updated protection service plan.

16. A non-transitory computer-readable medium storing instructions, which when executed by first management server within a first physical computing site, cause the first management server to perform a method comprising:
transmitting, by the first management server to a second management server within a second physical computing site, a plurality of protection service plans available within the first physical computing site for replication of data from the second physical computing site to the first physical computing site, wherein the each protection service plan includes a corresponding description of one or more service-level characteristics provided by each protection service plan, wherein each protection service plan provides an abstraction of a set of physical computing resources for providing replication within the first physical computing site treated as a single entity and wherein each protection service plan describes a particular range of values for each service-level characteristic provided for performing replication of data by that protection service plan and excludes a listing of specific physical computing resources of the first physical computing site that are to provide the service-level characteristics of that protection service plan;
receiving, by the first management server, selection of a protection service plan from the plurality of protection service plans and identification of data within the second physical computing site to add to the selected protection service plan for replication on the first physical computing site, wherein the selection specifies a minimum value within the corresponding range of values for each service-level characteristic provided by the selected protection service plan;
determining, by the first management server, physical resources within the first physical computing site that satisfy the service-level characteristics for the data added to the selected protection service plan, wherein the determination of physical resources is based upon the ranges of service level values specified for the selected protection service plan;
transmitting, by the first management server to one or more of the determined physical resources, configuration details to implement the replication of the data from the second physical computing site to the first physical computing site; and
receiving data for replication from the second physical computing site at the first physical computing site.

17. The non-transitory computer-readable medium of claim 16, wherein the physical resources excluded from the transmission of the protection service plans include host devices to receive replicated copies of the data under the protection service plans and data storage devices to store replicated copies of the data under the protection service plans.

18. A first management server within a first physical computing site comprising:
a processing device; and
a memory coupled to the processing device, the memory storing instructions which, when executed by the processing device, cause the management server to:
transmit, to a second management server within a second physical computing site, a plurality of protection service plans available within the first physical computing site for replication of data from the second physical computing site to the first physical computing site, wherein the each protection service plan includes a corresponding description of one or more service-level characteristics provided by each protection service plan, wherein each protection service plan provides an abstraction of a set of physical computing resources for providing replication within the first physical computing site treated as a single entity and wherein each protection service plan describes a particular range of values for each service-level characteristic provided for performing replication of data by that protection service plan and excludes a listing of specific physical computing resources of the first physical computing site that are to provide the service-level characteristics of that protection service plan;
receive selection of a protection service plan from the plurality of protection service plans and identification of data within the second physical computing site to add to the selected protection service plan for replication on the first physical computing site, wherein the selection specifies a minimum value within the corresponding range of values for each service-level characteristic provided by the selected protection service plan;
determine physical resources within the first physical computing site that satisfy the service-level characteristics for the data added to the selected protection service plan, wherein the determination of physical resources is based upon the ranges of service level values specified for the selected protection service plan;
transmit, to one or more of the determined physical resources, configuration details to implement the replication of the data from the second physical computing site to the first physical computing site; and
receive data for replication from the second physical computing site at the first physical computing sit.

19. The first management server of claim 18, wherein the physical resources excluded from the transmission of the protection service plans include host devices to receive replicated copies of the data under the protection service plans and data storage devices to store replicated copies of the data under the protection service plans.

* * * * *